United States Patent [19]
Hartmann et al.

[11] Patent Number: 5,404,236
[45] Date of Patent: Apr. 4, 1995

[54] DISPLAY DEVICE WITH CROSSING ELECTRODES WITH SPECIFIC RATIO FOR GRAY SCALE

[75] Inventors: Wilbert J. A. M. Hartmann; Johannes A. M. M. Van Haaren; Antonius G. H. Verhulst, all of Eindhoven, Netherlands

[73] Assignee: U.S. Philips Corporation, New York, N.Y.

[21] Appl. No.: 272,434

[22] Filed: Jul. 8, 1994

Related U.S. Application Data

[63] Continuation of Ser. No. 729,529, Apr. 15, 1991, abandoned.

[30] Foreign Application Priority Data

Apr. 20, 1990 [NL] Netherlands .................... 9000942

[51] Int. Cl.6 .......................................... G02F 1/1343
[52] U.S. Cl. ........................................ 359/54; 359/87; 359/56; 345/149; 345/89
[58] Field of Search .............. 359/54, 55, 56, 61, 359/84, 87, 88; 340/784, 793; 345/43, 103, 149, 89

[56] References Cited

U.S. PATENT DOCUMENTS

| | | | |
|---|---|---|---|
| 3,944,330 | 3/1976 | Tsunoda et al. | 359/87 |
| 4,035,060 | 7/1977 | Tsunoda et al. | 359/87 |
| 4,509,828 | 4/1985 | Clerc et al. | 359/54 |
| 4,791,417 | 12/1988 | Bobak | 340/784 |
| 4,850,675 | 7/1989 | Hatanaka et al. | 340/793 X |
| 5,124,695 | 6/1992 | Green | 340/784 |

FOREIGN PATENT DOCUMENTS

| | | |
|---|---|---|
| 0316774 | 5/1989 | European Pat. Off. |
| 0361981 | 4/1991 | European Pat. Off. |

OTHER PUBLICATIONS

"Halftone gray scale for matrix-addressed displays," Peter Pleshko, Infoemation Displays, Oct. 1990.

*Primary Examiner*—William L. Sikes
*Assistant Examiner*—Kenneth Parker
*Attorney, Agent, or Firm*—Norman N. Spain

[57] ABSTRACT

An electro-optic display device with grey scale set by areas of crossing electrodes. In one embodiment, there are 3 strip-shaped sub electrodes with a width relationship of 4:2:1, and two strip shaped column electrodes with a relationship of 8:1. In a second embodiment, there are 4 strip-shaped sub electrodes with a width relationship of 8:4:2:1, and two strip shaped column electrodes with a relationship of 16:1.

24 Claims, 3 Drawing Sheets

DISPLAY DEVICE WITH CROSSING ELECTRODES WITH SPECIFIC RATIO FOR GRAY SCALE

This is a continuation of application Ser. No. 07/729,529, filed Apr. 15, 1991, now abandoned.

BACKGROUND OF THE INVENTION

The invention relates to an electro-optical device comprising at least a cell with an electro-optical medium between two supporting plates provided with drive electrodes or picture electrodes, a drive electrode or picture electrode on one of the supporting plates being divided into k sub-electrodes having a surface ratio of $1:2: \ldots 2^{k-1}$, $k \geq 2$.

The invention also relates to a display device comprising such an electro-optical device.

Display devices of the type described can be used for displaying alphanumerical information or video images. The device in itself can be used as an optical shutter in, for example, printers.

A device of the above-mentioned type is described in EP-A-0,316,774. The device described in this application is driven by means of the so-called multiplex drive mode in which in a system of selection lines or address lines (row electrodes) and data lines (column electrodes) perpendicularly crossing one another the drive is effected by alternately energizing the address lines while the information to be written is presented to the data lines. By dividing the column electrodes into sub-electrodes (for example, in accordance with surface ratios of 4:2:1) different transmission levels (grey scales) can be introduced in such a device.

To be able to introduce a large number of grey scales (for example, more than 50) the number of sub-electrodes per column increases considerably (5 or more). Although this can be obviated to some extent by subdividing the row electrodes into sub-electrodes as well, as is suggested in EP-A-0,316,774, this leads to other problems such as, for example, a smaller number of grey scales to be realised, because one grey scale can be defined in a plurality of ways.

OBJECTS AND SUMMARY OF THE INVENTION

It is one of the objects of the invention to provide a device of the type described in the opening paragraph in which there is a uniform relation between a given transmission value and the associated way of energization. It is another object of the invention to provide a display device in which a maximum possible number of grey scales is obtained with a minimum possible number of sub-electrodes.

To this end a device according to the invention is characterized in that the drive electrode or picture electrode on the other supporting plate is divided into r sub-electrodes ($r \geq 2$) having a surface ratio of at least: $2^{(r-1)k}: \ldots :2^k:1$.

This subdivision prevents one and the same surface of the display cell from becoming light-transmissive or non-transmissive by several choices of energization (dependent on the electro-optical effect used and on possible polarizers).

A display device according to the invention comprises a plurality of display cells at the area of crossings of strip-shaped row and column electrodes, the column electrodes being divided into k strip-shaped sub-electrodes having a width ratio of $1:2: \ldots : 2^{k-1}$, $k \geq 2$ and the row electrodes being divided at least at the area of the crossings into two strip-shaped sub-electrodes having a width ratio of at least: $2^k:1$.

The above-mentioned uniform relation between grey scale and drive is achieved with a subdivision of the row electrodes into only two sub-electrodes so that the double drive frequency is sufficient for this drive mode. Moreover, since the number of grey scales is maximum (64 and 256 for 3 and 4 (column) electrodes, respectively) the number of column connections may be smaller. The total number of connections (row and column connections) is considerably smaller than in a display device as shown in EP-A-0,316,774 (with the same number of grey scales).

A preferred embodiment of a display device according to the invention is characterized in that a column electrode comprises at least three sub-electrodes the narrowest and widest of which are passed to the exterior at one and the same side of the cross-bar system. By passing the other sub-electrodes to the exterior at the other side, the external connections may be wider or they may be provided while using a wider tolerance.

For similar reasons each strip-shaped sub-electrode of a row electrode is preferably passed to the exterior at different sides of the cross-bar system.

A further embodiment of a device according to the invention is characterized in that a sub-electrode is always located between parts of other sub-electrodes. A sub-electrode is preferably located between parts of the sub-electrode having the larger surface but one.

It is thereby achieved that the optical centre of a picture cell remains the same at different transmission levels. This is notably achieved if a sub-electrode is substantially entirely surrounded by a sub-electrode which is the next larger in surface size.

The invention is particularly suitable for electro-optical media having a bistable switching character such as, for example, ferro-electric liquid crystals, but also for twisted nematic liquid crystals having a large twist angle (SBE, STN) or other electro-optical media having a steep transmission/voltage characteristic.

These and other aspects of the invention will now be described in greater detail with reference to some embodiments and the drawing.

DESCRIPTION OF THE PREFERRED EMBODIMENTS

Figure 1:
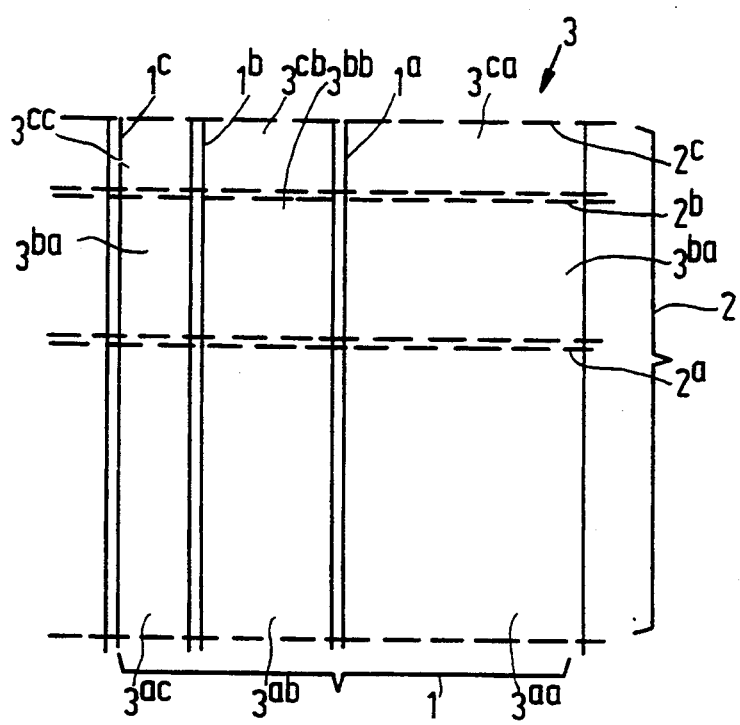
FIG. 1 shows a display cell with an exponential subdivision of the two electrodes in a diagrammatic plan view.

FIG. 1 shows diagrammatically a subdivision of electrodes 1, 2 between which an electro-optical material is present. In this example the electrodes, for example, a column electrode 1 and a row electrode 2, are divided into sub-electrodes $1^a$, $1^b$, $1^c$ and $2^a$, $2^b$, $2^c$, respectively, whose widths are in a ratio of 4:2:1. At the area of the crossings of the electrodes 1 (electrode strips) ($1^a$, $1^b$, $1^c$) and 2 ($2^a$, $2^b$, $2^c$) a display cell 3 is defined which can entirely or partly change its electro-optical properties by driving the sub-electrodes in a suitable manner. Although the device is described as a display cell in this application, it may also be used as an optical shutter, with the drive varying the quantity of light which is passed.

If a liquid crystal is used as the electro-optical medium, the (sub-)electrodes may receive such a voltage that a given voltage threshold is exceeded and that the transmission state changes (locally), for example, from light-absorbing to light-transmissive, or conversely. This behaviour may also be determined by the position of polarizers, if any.

Since the electrodes 1, 2 are divided into sub-electrodes, it is possible to drive only a portion of the display cell 3. When the sub-electrodes $1^a$ and $2^a$ are correctly energized, the portion $3^{aa}$ of the display cell is driven so that this portion becomes, for example, light-transmissive, whereas the other portion of the display cell remains opaque. When the sub-electrodes $1^a$ and $2^b$ are energized, the portion $3^{ab}$ is driven, etc. In this way different surfaces of the display cell 3 can be driven so that different ratios of light transmissive/non-transmissive (white/black) values are obtained, in other words, different grey scales.

However, the drive of the various grey scales in the device of FIG. 1 is not unambiguous. For example, driving the portion $3^{ac}$ yields the same transmission value (grey scale) as driving the portion $3^{ca}$, driving the portions $3^{ab}$ and $3^{bb}$ yields the same transmission value (grey scale) as driving the portions $3^{ba}$ and $3^{bb}$. In fact the total number of grey scales is then limited to 50. When dividing the electrodes 1, 2 into four sub-electrodes in accordance with the ratio of 8:4:2:1, the maximum number of grey scales which can be realised appears to be 226.

With such a subdivision the picture information determining the grey scales and when originating from one line in, for example, video applications must be written by successively energizing three (four) sub-electrodes $2^a$, $2^b$ $2^c$ ($2^d$) while simultaneously presenting the correct information to the column electrodes. This implies that a three-(four)-fold frequency must be used for driving the device in video applications. This may lead to problems, notably in the case of slower electro-optical effects. Moreover, the realisation of such display devices driven at high frequencies involves many extra electronic components.

Figure 2:
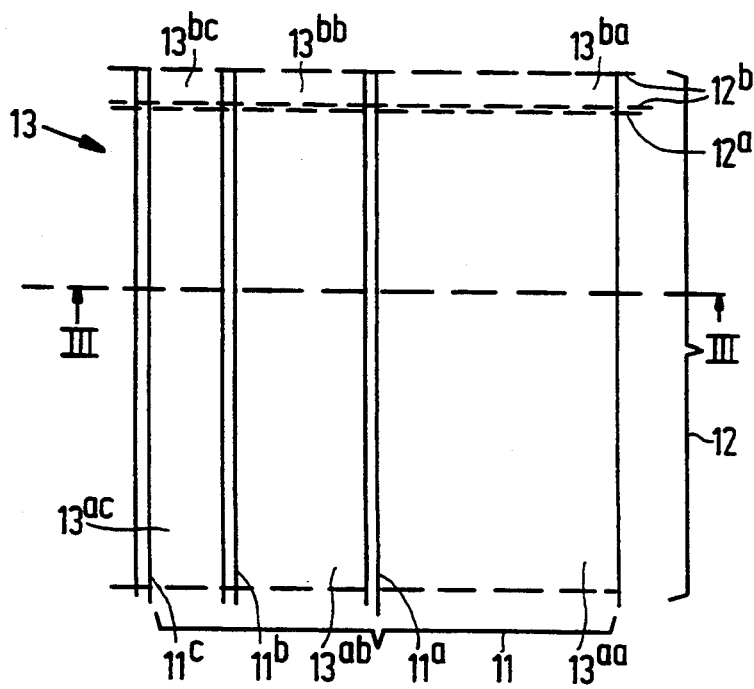
FIG. 2 shows another display cell according to the invention in a diagrammatic plan view.

FIG. 2 shows a display cell 13 which is similar to the display cell of FIG. 1 in that the one electrode (column electrode) is divided again into three (strip-shaped) sub-electrodes $11^a$, $11^b$, $11^c$ having a width ratio of 4:2:1 (k=3).

According to the invention the other electrode (row electrode) 12 is now divided into only two (strip-shaped) sub-electrodes having a mutual width ratio of $2^k$:1, i.e. 8:1. With such a subdivision all combinations of partial cells $13^{aa}$, $13^{ab}$, ... $13^{cc}$ are unambiguously related to different transmission values (grey scales) of the display cell 13 when the row electrodes $12^a$, $12^b$ and the sub-electrodes $11^a$, $11^b$, $11^c$ are energized accordingly. With the shown subdivision of the column electrode 11 into three sub-electrodes a maximum number of 64 grey scales can be realised; this number is 256 in the case of subdivision into four sub-electrodes. Moreover, since it is sufficient to use two connections for the (row) electrodes 12, the total number of connections in a display device based on such a display cell 13 decreases considerably.

The two row electrodes provide the possibility of driving the display device in, for example, video applications with the double line frequency as the driving frequency. The remaining electronic circuitry will then also be simpler.

Figure 3:
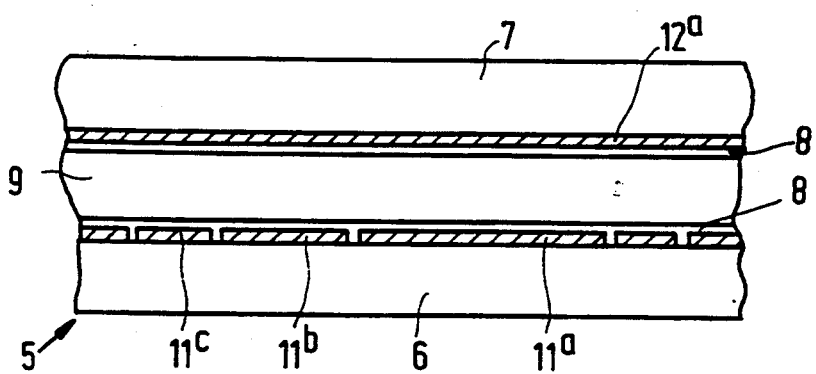
FIG. 3 is a diagrammatic cross-section taken on the line III—III in FIG. 2.

FIG. 3 is a diagrammatic cross-section of a part of a liquid crystal display device taken on the line III—III in FIG. 1.

The electrodes 11 and 12 are provided as parallel strips of transparent conducting material (for example indium tin oxide) on transparent substrates 6, 7 of, for example glass or quartz. Said electrodes 11 and 12 are subdivided, as described above, into column sub-electrodes $11^a$, $11^b$, $11^c$ and row electrodes $12^a$, $12^b$. To give the liquid crystal molecules at the area of the electrodes a given preferred direction, the electrodes are coated with an electrically insulating layer or orientation layer 8. A layer of liquid crystal material 9, in this case a retro-electric liquid crystal material is present between the two substrates 6, 7. The device may be used as a display device and will be provided in the conventional manner with polarizers and/or mirrors and with a light source. The device may be adapted as a light shutter which, dependent on the adjusted transmission value, passes a larger or smaller quantity of light.

Figure 4:
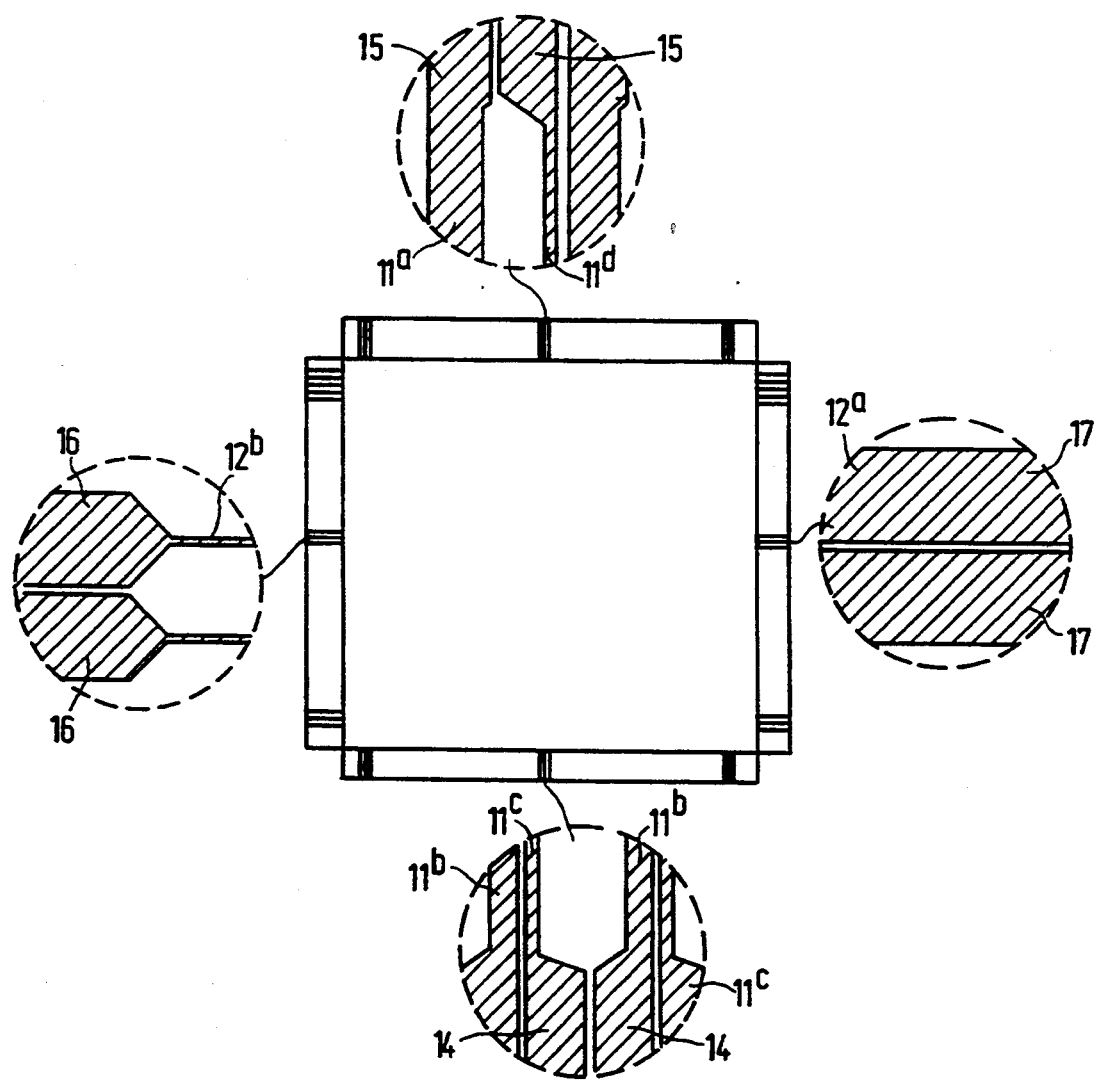
FIG. 4 is a plan view of a display device according to the invention, showing the external connections.

FIG. 4 is a diagrammatic plan view of parts of a display device according to the invention in which the column electrodes 11 are subdivided into four sub-electrodes $11^a 11^b$, $11^c$, $11^d$ in accordance with a width ratio of 8:4:2:1. By providing the narrow sub-electrode $11^d$ together with the widest sub-electrode $11^a$ at one side of the display device with connection conductors 15, and the two other sub-electrodes $11^b$, $11^c$ at the other opposite side with connection conductors 14, only two sub-columns need to be connected at each side. Consequently a wider tolerance is obtained for providing the connection conductors 14, 15 and for aligning integrated circuits to be connected thereto, for example, for presenting information to be displayed. Similarly, one connection per row electrode 12 (subdivided into sub-electrodes $12^a$, $12^b$ with a mutual width ratio of 16:1) may be sufficient at the two other sides of the device by providing all narrow row sub-electrodes $12^b$ with connection conductors 16 at one side and all wide row sub-electrodes with connection conductors 17 at the other side.

Figure 5:
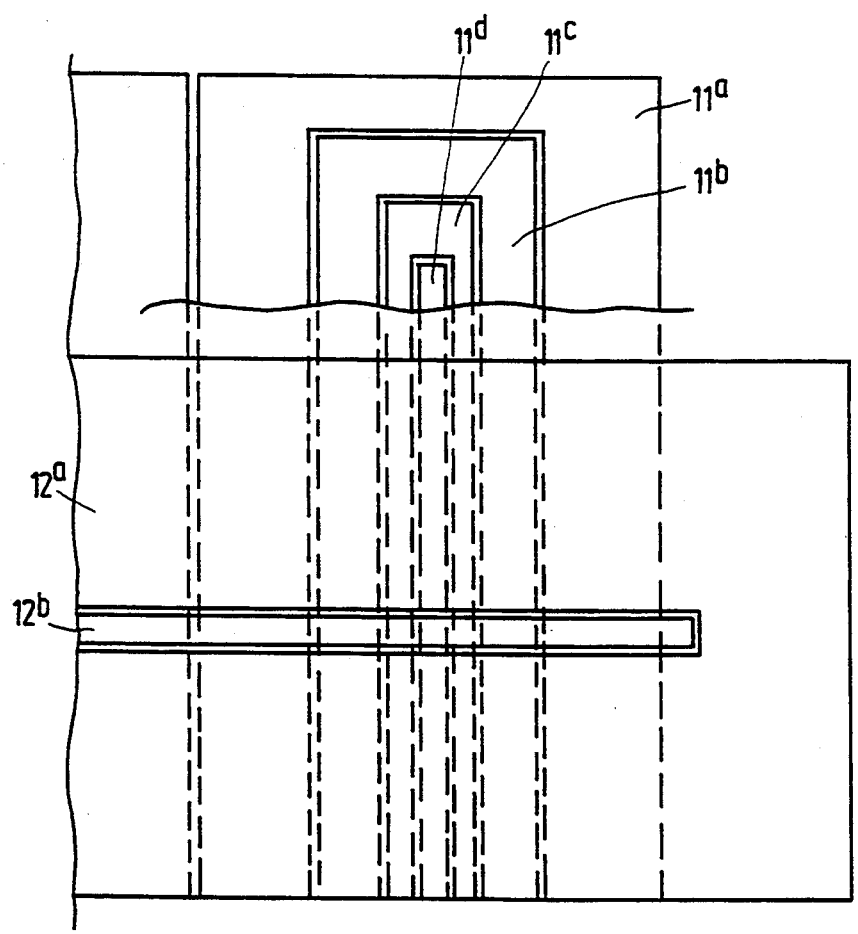
FIG. 5 shows another (display) device according to the invention in a diagrammatic plan view.

FIG. 5 shows a slightly different subdivision of the sub-electrodes in which the (column) electrode $11^d$ is substantially entirely surrounded by the sub-electrode $11^c$ which in turn is substantially entirely surrounded by the sub-electrode $11^b$ and so forth. In the same manner the (row) sub-electrode $12^b$ is substantially entirely surrounded by the (row) sub-electrode $12^a$. It is thereby achieved that, independent of the drive, hence of the grey scale, the so-called "optical centre" does not change which is advantageous as far as viewing is concerned. In this case the sub-electrodes are situated outside the actual display area around the sub-electrodes having the smaller surface, but this is not absolutely necessary. The smaller sub-electrodes may be situated, if necessary, between two parts of the subsequent sub-electrode, which parts are energized separately.

Figure 6:
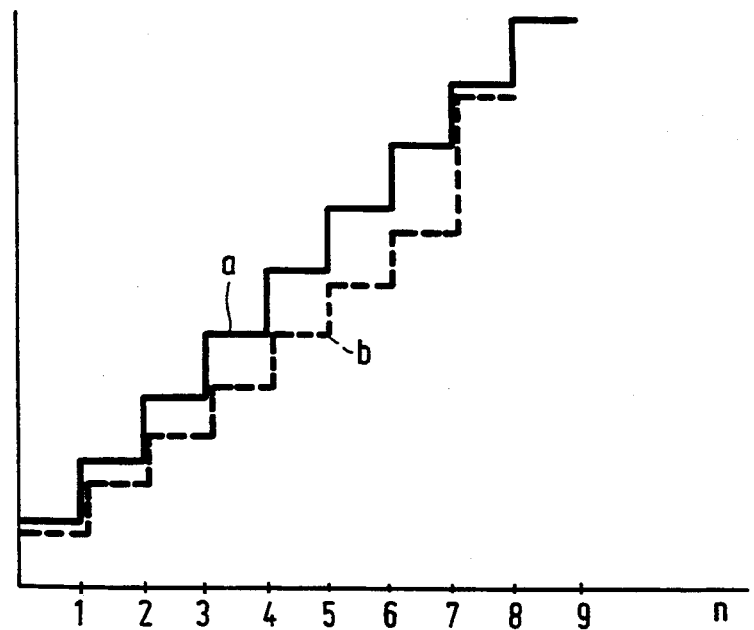
FIG. 6 shows diagrammatically how different transmission values (grey scales) can be adjusted in a device according to the invention.

In the devices according to the invention shown in the Figures the smallest portion of the display cell 13 which can be driven has a surface A (the portion $13^{bc}$ in FIG. 2). This can be driven by energizing the sub-electrodes $11^c$ and $12^b$. By energizing the sub-electrodes $11^b$ and $12^b$ the portion $13^{bb}$ having a size of 2A is driven. It will be evident that any value between 0 (no driven) and $63a$ (fully driven) can be obtained by a correct choice of the sub-electrodes (for example 7a by energizing sub-electrodes $11^a$, $11^b$, $11^c$ and $12^b$ and $8^a$ by energizing sub-electrodes $11^c$ and $12^a$, $9^a$ by energizing sub-electrodes $11^c$, $12^a$, $12^b$, etc.) The width ratio chosen for the (row) sub-electrodes $12^a$, $12^b$ of 8:1 provides the possibility of increasing the driven portion of the cell with the same quantity of surface. (See curve a in FIG. 6). In the case of a different choice of the width ratio (for example, 10:1) the smallest portion which can be driven will have a slightly smaller surface which may initially increase with the same quantity ($12^b$ is energized together with various combinations of $11^a$, $11^b$, $11^c$) and subsequently (when energizing $12^a$ and $11^c$) with a much larger increase of the portion which is driven. (Curve b in FIG. 6). Although the total number of grey scales is not changed, the distance between two scales, notably in the darkest part of the transmission/voltage curve is reduced (1/77 instead of 1/64). This corresponds better to the eye sensitivity curve, while the larger intervals occurring at higher transmission values have much less influence.

It will be evident that the invention is not limited to the examples shown, and that several variations are possible within the scope of the invention.

For example, several configurations other than the straight strips shown are possible for the (sub-)electrodes 11, 12.

Instead of ferro-electric liquid crystal medium 9 other electro-optical media may be used, particularly when they have a binary switching behaviour (media having a hysteresis) but also when the voltage-transmission curve is very steep as in the case of, for example supertwist-nematic liquid crystals. The display device may then be driven in the transmission mode or in the reflection mode.

The invention is not limited to the passive drive shown, but the (sub-)electrodes can be implemented as picture electrodes which are driven via active switching elements (for example, diodes)

We claim:

1. A display device comprising an electro-optical medium between two supporting plates comprising a plurality of display cells at the area of crossings of strip-shaped row and column electrodes, the column and row electrodes being divided into strip-shaped sub-electrodes characterized in that the column electrodes are divided into three strip-shaped sub-electrodes having a width ratio 4:2:1 and the row electrodes are divided into two strip-shaped sub-electrodes the sub-electrodes of the row electrodes at the area of the crossing having a width ratio of at least 8:1.

2. A display device as claimed in claim 1, characterized in that each strip-shaped sub-electrode of a row electrode is passed to the exterior at different sides of the cross-bar system.

3. A device as claimed in claim 2, characterized in that at least one sub-electrode is located at least partially between portion of another sub-electrode.

4. A device as claimed in claim 2, characterized in that the electro-optical medium is a ferro-electric liquid crystal material.

5. A device as claimed in claim 1, characterized in that at least one sub-electrode is located between parts of other sub-electrodes.

6. A device as claimed in claim 5, characterized in that the electro-optical medium is a ferro-electric liquid crystal material.

7. The device as claimed in claim 5, characterized in that a sub-electrode is at least partially surrounded by another sub-electrode having the next larger surface.

8. A device as claimed in claim 7, characterized in that a sub-electrode which is the next larger in surface area size substantially entirely surrounds a sub-electrode.

9. A device as claimed in claim 7, characterized in that the electro-optical medium is a ferro-electric liquid crystal material.

10. A device as claimed in claim 8, characterized in that the electro-optical medium is a ferro-electric liquid crystal material.

11. A device as claimed in claim 1, characterized in that the electro-optical medium is a ferro-electric liquid crystal material.

12. A device as claimed in claim 1, characterized in that the electro-optical medium is a ferro-electric liquid crystal material.

13. The display device of claim 1 wherein the narrowest and the widest of the sub-electrodes of a column electrode are passed to the exterior at one and the same side of the cross-bar system.

14. A device as claimed in claim 13, characterized in that at least one sub-electrode is located at least partially between portions of another sub-electrode.

15. A display device comprising an electro-optical medium between two supporting plates comprising a plurality of display cells at the area of crossings of strip-shaped row and column electrodes, the column and row electrodes being divided into strip-shaped sub-electrodes characterized in that the column electrodes are divided into four strip-shaped sub-electrodes having a width ratio 8:4:2:1 and the row electrodes are divided into two strip-shaped sub-electrode the sub-electrodes of the row electrodes at the area of the crossing having a width ratio of at least 16:1.

16. A display device as claimed in claim 15, characterized in that each strip-shaped sub-electrode of a row electrode is passed to the exterior at different sides of the cross-bar system.

17. A device as claimed in claim 16, characterized in that at least one sub-electrode is located between parts of the other sub-electrodes.

18. A device as claimed in claim 15, characterized in that at least one sub-electrode is located at least partially between portions of another sub-electrode.

19. The device as claimed in claim 18, characterized in that a sub-electrode is at least partially surrounded by another sub-electrode having the next lager surface.

20. A device as claimed in claim 19, characterized in that a sub-electrode is the next larger in surface area size substantially entirely surrounds a sub-electrode.

21. A device as claimed in claim 19, characterized in that the electro-optical medium is a ferro-electric liquid crystal material.

22. A device as claimed in claim 15, characterized in that the electro-optical medium is a ferro-electric liquid crystal material.

23. The display device of claim 15 wherein the narrowest and the widest of the sub-electrodes of a column electrode are passed to the exterior at one and the same side of the cross-bar system.

24. A device as claimed in claim 23, characterized in that at least one sub-electrode is located at least partially between portions of another sub-electrode.

* * * * *